Aug. 27, 1940.      W. C. GROENIGER      2,212,538
DEFECATOR
Filed April 4, 1939      2 Sheets-Sheet 1

INVENTOR
William C. Groeniger
BY
HIS ATTORNEY

Aug. 27, 1940.   W. C. GROENIGER   2,212,538
DEFECATOR
Filed April 4, 1939   2 Sheets-Sheet 2

INVENTOR
William C. Groeniger
BY
Henry J. Lucke
HIS ATTORNEY

Patented Aug. 27, 1940

2,212,538

UNITED STATES PATENT OFFICE 2,212,538

DEFECATOR

William C. Groeniger, Columbus, Ohio, assignor to John B. Pierce Foundation, New York, N. Y., a corporation of New York Application April 4, 1939, Serial No. 265,907

5 Claims. (Cl. 4—69)

This invention relates to defecators.

The invention is applicable to defecators, inclusive of water closet bowls, urinals, medical and other sanitary bowls or receptacles, advantageously having an outlet at a lateral side, and provided with suitable means for the supply of water or equivalent effluent.

It is an object of the present invention to improve the performance of the evacuation or waste discharge function of defecators and the like, by a more efficient distribution of the fluid employed for flushing. The improved hydraulic efficiency of defecators embodying the present invention, affords a material reduction in the quantity of fluid required for the flushing operation, reduction in time necessary for complete evacuation, and optimum quality of silence in operation.

Additionally, it is an object of the present invention to achieve a complete evacuation of the waste-matter content of the defecator, inclusive of matter deposited on the walls of the bowl above the normal level of the trap seal, by the correlated introduction of the flushing water or equivalent into the bowl of the defecator through a plurality of channels, the mutual operative relationship of the channels and the timing of water flow therethrough affording a sequence of operation which is novel and highly advantageous in attaining the flushing of the defecator with minimum water flow and at maximum speed.

Further, in the present invention, means are provided whereby atmospheric air may flow into the flushing water supply chamber of the defecator during the stage of cessation of flushing water inflow but before the complete cessation thereof, such inflow of atmospheric air being in quantities sufficient to dissipate a possible vacuum or sub-atmospheric pressure condition at the point of water inflow.

It is a feature of this invention that the anterior leg of the evacuator, i. e., discharge passage, of the defecator, extends forwardly and upwardly of the defecator bowl, and is disposed immediately opposite a jet opening constituting the terminus of a short water-flow channel communicating directly with a flushing water supply chamber arranged for connection with a flush valve, flushing tank or other conventional source of supply. Such organization provides for a flow of an initial volume of the flushing liquid directly and immediately into the trap seal of the bowl, such flow instituting an almost instantaneous spill of water over the dam weir and into the evacuator downflow leg.

Such directed flow of water is the first of a series of three correlated actions, the second action being the inauguration of a centripetal movement of the trap seal fluid of the bowl and its contents, and the third, a scouring of the upper walls of the bowl by a plurality of water jets emanating from an integral flush rim, combined seat and flush rim, or equivalent. Such actions function cooperatively to accomplish a thorough evacuation and cleansing of the defecator with a minimum water requirement and at maximum speed.

Essential characteristics of preferred forms of my invention therefore reside in imparting by the supplied effluent to the contents of the well-portion of the bowl an undertow jet effective to initiate movement of the solid or semi-solid contents of the defecator bowl forwardly and upwardly into the anterior leg of the evacuator, and simultaneously initiating a syphonic action of the liquid content of the bowl effective to cause positive passage of the contents of the bowl into the soil pipe or equivalent; concurrently and secondly, imparting a vortex movement to the contents of the bowl by a pressure-jet of flushing water introduced tangentially of the bowl at a point approximate the surface of the normal level of the fluid in the bowl, such vortex movement forcibly carrying solid and/or semi-solid waste material downwardly into evacuation position and thus assisting the evacuation; and finally, discharge through suitable rim-jet orifices to effect a thorough scouring of the upper wall portions of the bowl.

Other features and advantages hereinafter appear.

Figure 1:
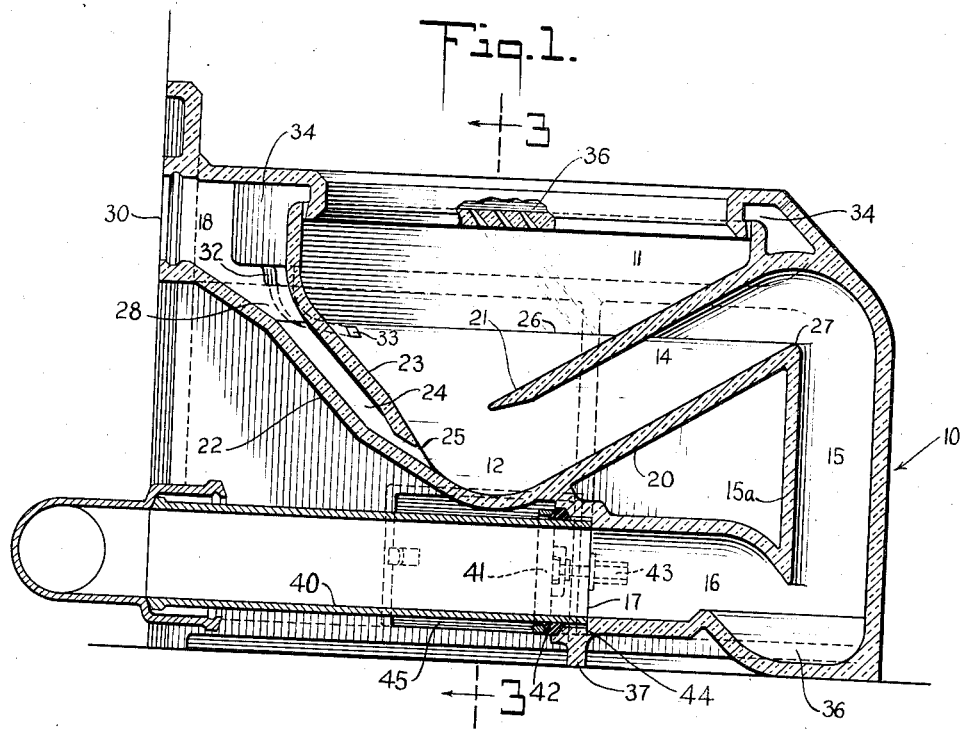
Fig. 1 is a vertical section of a defecator made pursuant to the present invention, one manner of affording connection with a soil pipe being illustrated.
Figure 2:
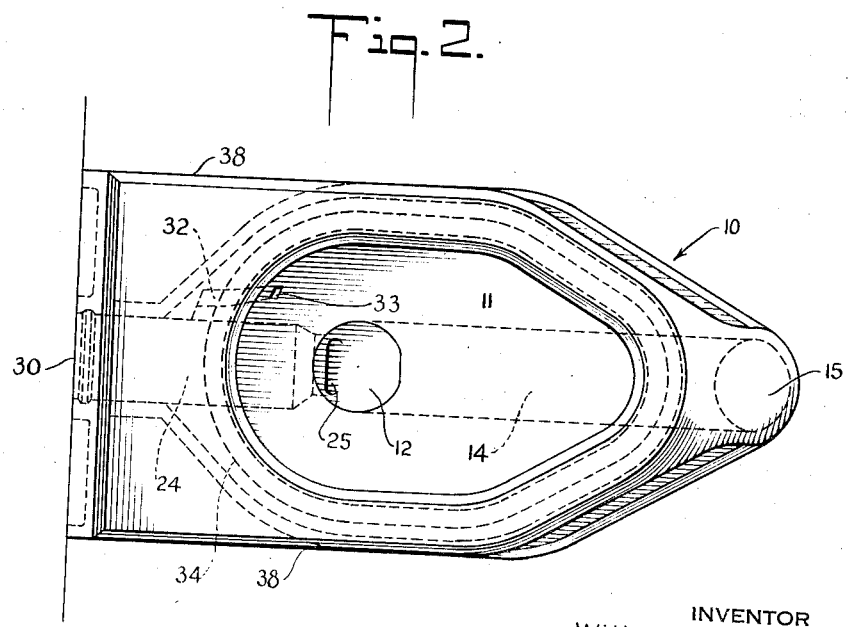
Fig. 2 is a plan view of the defecator.

Referring to Figs. 1 and 2, the illustrated embodiment of the present invention contemplates a defecator 10, desirably of molded ceramic material so constructed as to be without evident joint, and desirably, also, provided with integral side walls affording support for the defecator, to render the same independent of hangers or the like.

The defecator comprises, in fundamentals, a bowl 11 having a substantially centrally disposed well 12, an evacuator having an upflow or anterior leg 14, a preferably vertically arranged downflow leg 15, and an outflow 16, the terminal outlet 17 of which is horizontally and rearwardly directed, and preferably disposed adjacent the front central portion of the bowl. A flushing water supply chamber 18 is operatively associated with a plurality of flow channels, later specifically described.

The lowermost wall of the defecator bowl has a front section 20 which is in parallel spaced relationship with a front pan 21 and cooperates therewith to form walls of the upflow leg 14. A rear section 22 defines, with rear pan 23, a main flushing or momentum jet channel 24; discharge orifice 25 thereof is desirably tangential to the slope of the well 12, and disposed directly opposite the preferably belled mouth of the upflow leg 14.

Figure 3:
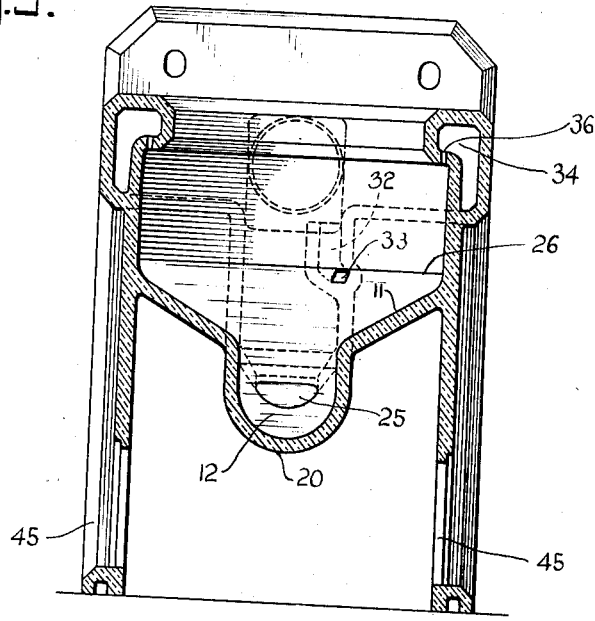
Fig. 3 is a vertical section, taken along the line 3—3 of Fig. 1.
Figure 4:
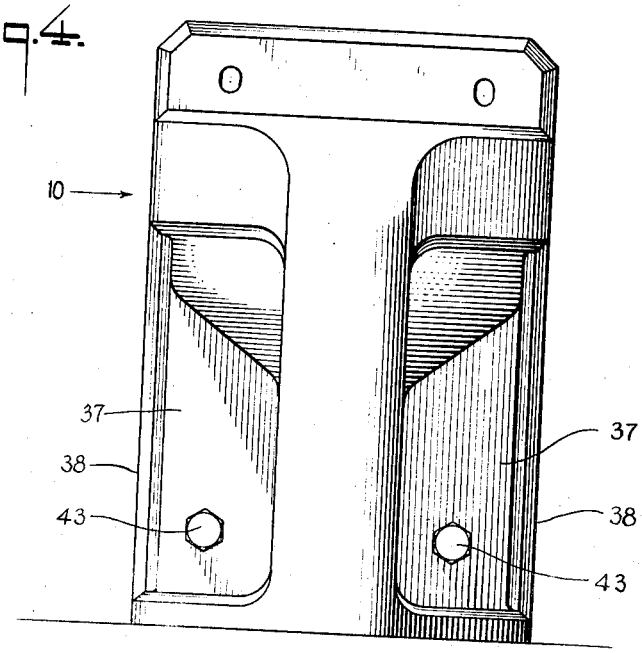
Fig. 4 is a front elevation of the defecator.

As appears from Figs. 1 and 3, the bowl 11 is free of re-entrant formation, affording maximum facility for scouring the said bowl, or like sanitary treatment. The normal level 26 of fluid in the bowl is established by the dam or weir 27 at the uppermost terminal of wall-section 20. Such fluid within the bowl comprises the trap-sealing fluid; to afford a depth of trap-seal pursuant to sanitary requirements, while affording a maximum area of bowl fluid, the anterior or upflow syphon leg 14 is of comparatively gentle slope. Momentum jet flushing channel 24, conforming to the slope of the rear pan 23, is of relatively steep inclination.

Flushing water or equivalent is introduced into the bowl of the defactor through a plurality of main channels, each of said channels being arranged to function in a pre-established timed relationship. Momentum jet channel 24, as shown, extends directly and without appreciable curvature, between supply chamber 18 and the well 12. Said channel 24 is, therefore, short, insuring a direct and immediate flow of flushing water into the bowl. The relatively large mouth 28 of such momentum jet passage 24 is preferably proximate the inlet opening 30 of chamber 18. Desirably, said mouth 28 slopes gradually to the normal level of water within the chamber 18.

It will be understood that inlet opening 30 is arranged for connection to a suitable supply of flushing liquid under suitable pressure. Connection may be made to a conventional flushometer valve, flush tank, or the like.

As shown in Fig. 1, passage 24 is substantially wholly flooded. Said passage 24 is of relatively small cubic capacity; in such an organization, the initial stage of flushing the defecator is free from the common fault of discharging a large volume of entrapped air into the bowl below the waterline thereof. Such freedom from air discharge decreases the time interval of complete evacuation of the bowl.

To afford a centripetal movement of fluid within the bowl, said centripetal movement being operative after the commencement of discharge through momentum jet orifice 25, there is provided a vortex-jet passage 32, see Figs. 1 and 3, terminating in a discharge orifice 33. Said orifice 33 is arranged to direct an outflowing water stream tangentially of the bowl 11, and thus to create a vortical action in the liquid therein, the resultant vortex having a "base" coinciding with the well 12. Desirably, said channel 32 communicates with chamber 18 at a side wall thereof, and at a point substantially above the level 26 of fluid in the bowl; the discharge 33 of said channel may be submerged, but relatively near the said fluid level.

The relatively small opening of channel 32 at chamber 18, and the arrangement thereof in said chamber, restricts any appreciable volume of flow through said channel at the inception of flushing water inflow into said chamber 18. The path of least resistance to flow being through mouth 28 and channel 24, it is not until the stage of flooding of chamber 18 and development of suitable flow pressure within said chamber, that pressure flow through channel 32 is effected.

Finally, water is discharged into the bowl 11 from above the normal water level thereof, such flow occurring through a suitable plurality of rim jet openings 36, fed from a flush rim channel 34, combined seat and flush rim, or equivalent. Flush rim channel 34, in the embodiment shown, receives water from chamber 18 upon the flooding thereof, but the elevated position of rim jets 36 with respect to the main horizontally disposed body of channel 34 delays discharge therethrough until the momentum jet and vortical components of the flushing operation are well established.

Because said flushing operation, and particularly the vortical component thereof, is in full operation at the time rim flush discharge occurs, discharge through the rim flush openings does not "undercut" the vortex action, nor otherwise affect the sequence of operation.

At the inception of flushing operation, discharge through momentum jet 25 commences substantially immediately upon the actuation of the flushing means, by reason of the direct communication of channel 24 with chamber 18, and the very short path of travel of flushing water through said momentum jet channel and into the well. Preferably, and as is shown in Fig. 3, the jet opening 25 is semi-elliptical in cross section, the lower wall of said jet substantially conforming to the curvature of the well 12, whereas the upper edge of the jet opening may be horizontal. Also, and as is shown in Fig. 1, the jet opening is constricted, thus accelerating the velocity of discharge through said opening, and engendering suitable nozzle pressure at said jet opening 25.

Discharge of water through jet opening 25 follows the curvature of the well and directs a shallow, flat-topped stream of water of appreciable volume into the evacuator leg 14. The resultant undertow in well 12 operates to overcome the inertia of solids therein and to initiate movement of such solids into the anterior leg 14 of the evacuator. The relatively flat upper edge of the jet opening 25 accentuates the undertow effect, without causing undue turbulence within the volume of fluid contained in the bowl.

Flow through jet 25 initiates a substantially immediate syphonic flow of the contents of the bowl into and through the evacuator, such syphonic flow commencing before the vortex jet and rim-flush discharges become active. This prevents the creation of excessive "head" in the bowl, tends to draw the contents of the bowl toward the well 12 and away from the side walls of the bowl, and causes solids and semi-solids to lead the discharge, instead of "tail" it, as in the majority of presently known bowl constructions. Syphonic flow is rendered more efficient, hydraulically, by the shortness of the path of flushing water through channel 24, and the undertow and positive propulsion of solids into the evacuator leg 14 effected by discharge through momentum jet orifice 25.

Upon the raising of the water level within the chamber 18 to the point of entrance of channel 32, tangential discharge through jet 33 commences. Such tangential discharge into the bowl follows the initiation of syphonic flow through the evacuator. The clockwise motion of the liquid within the bowl induces a strong centripetal action which carries floating and/or semi-solid materials into the zone of the well 12, whence they are discharged by syphonic flow. The flat, broad stream of the momentum jet acts to establish the maximum depth of vortex, restraining air flow from said vortex into the leg 14. The momentum jet feeds water to the vortex to insure continuous syphonic action and to preclude an air flow through anterior leg 14 from breaking the syphon. The syphonic action is broken by air entry through 12 when the flush is completed.

Subsequent to the initiation of the first two stages of flushing, but occurring in such sequence that all of the flushing stages are operating concurrently, flushing water passes through the channel 34 and discharges against the upper walls of the bowl through the plurality of rim jets 36. As shown in Fig. 1, the slope of said rim jets 36 conforms to the direction of vortical movement of the liquid within the bowl, and therefore assists such vortical movement. The slope and configuration of the jets 36, and the spacing between adjacent jets, insures a thorough scouring of the upper surface of the bowl. When the pressure at rim jets 36 is greatest, the discharge therefrom follows the maximum trajectory, as indicated in Fig. 1; as the pressure diminishes, the angle of discharge from said rim jets approaches the vertical. Such operation provides a fan-shaped area of scour.

As apparent from the foregoing, the performance and operative effect of the undertow or momentum jet and the vortex jet are entirely independent of the operation of the rim-jet openings. The slope and volumetric discharge from said openings are not critical factors in the operation of the defecator, and the tolerances to which such jet openings must be held in manufacture, are greatly broadened.

The relatively short duration of the rim flush substantially reduces the amount of noise incident to the flushing operation.

During the final stages of the flushing operation, the cessation of water flow through rim jets 36 opens said jets to atmospheric air, and provides for the inflow of atmospheric air to the chamber 18. Such air inflow assists the final discharge through the vortex jet orifice 33 and the undertow jet orifice 25, and in addition, may serve to dissipate any vacuum condition present in the water supply line. Syphonage of the contents of the bowl back into the water supply line may thereby be prevented.

Channel 34 acts as a reservoir, from which water drains into chamber 18 and thence through channel 24, during the final stages of operation. The refill of the bowl is accomplished through submerged channel 24, eliminating refill noise.

The posterior leg 15 of the evacuator system is desirably oval in cross section, as is apparent from Fig. 2. The posterior leg discharges into a pocket 36, the level of entrapped water within the pocket being substantially as illustrated. The rear wall 15a of said leg 15 may be approximately centrally located with respect to the pocket 36, and the lower edge of said wall is spaced at a relatively short distance above said entrapped water level. During the final stages of discharge from the bowl, when the volume of water passing through the evacuator system is appreciably reduced, the relatively small free opening between the posterior syphon leg and the discharge passage 16 insures the retention of a water curtain effective to prevent a back flow of air through passage 16 and into the syphon legs 15 and 14, prior to the completion of the syphonic flow through the evacuator. The gradual upward slope of the wall defining the outlet side of the pocket 36 likewise causes the formation of a water curtain during the stage of substantial volume flow of liquid through the evacuator.

As shown in Fig. 1, and as more fully described in my presently co-pending application Serial No. 174,919, filed November 17, 1937, and entitled Defecator with universal wall or floor outlet connection, the terminus 17 of the discharge leg 16 is disposed substantially centrally of the bowl and preferably is formed as a unitary structure with a transverse wall 37, said wall extending to a point of juncture with the sidewalls 38, 38 of the defecator, and desirably being integral with the wall 20 defining the lower wall of the bowl 11. Also, as appears from Fig. 1, the transverse wall 37 terminates in a plane in common with the base of the defecator. Such transverse wall construction affords optimum support for the otherwise substantially unsupported inner central portion of the defecator, and also, provides externally accessible means whereby a water and gas tight joint between soil pipe 40 and outlet 17 can be effected.

As a means of making such tight joint, I have illustrated a yoke 41 and gasket 42, said yoke being secured by means of the illustrated bolts 43, 43, which pass through the transverse wall 37 and bear thereagainst. Taking up on the bolts draws the yoke tightly against the gasket 42 to compress the same about the soil pipe 40, while urging it into water sealing engagement with the bevel mouth of the discharge opening 17. As indicated, the said mouth is provided with a shoulder 44 which limits the insertion of the soil pipe into the passage 16. Desirably, said shoulder 44 has a substantially smooth surface, to cooperate with the smooth end surfaces of the soil pipe 40 in effecting a substantial water tight point of connection.

Access openings 45, 45, disposed suitably adjacent the point of connection of soil pipe and discharge outlet, facilitate the making of the connection, the inspection of the same subsequent to connection, and the ready repair of the joint, or of the elements thereof, at any later date. Any suitable closure plates for said openings may be provided.

Desirably, side walls 38 are smoothly finished at the rear surfaces thereof, so that the defecator may be abutted against a finished wall. In this manner, side walls 38, 38 and transverse walls 37, 37 cooperate with such finished building wall to form an enclosure within which the soil pipe connection 40 may be run. The accessibility of the point of connection of said soil pipe with the outflow terminus 17 minimizes the time required for making connections, and affords optimum facility for testing the completed joint.

Whereas I have described my invention by reference to specific forms thereof, it will be understood that many changes and modifications may be made without departing from the spirit of the invention.

I claim:

1. A defecator, comprising a bowl, an evacuator system including an anterior syphon leg having a mouth disposed at a lower central portion of said bowl and extending forwardly and upwardly of said bowl, said anterior leg serving to establish the normal level of fluid within said bowl, a posterior or downflow leg disposed forwardly of said bowl and operatively associated with said anterior leg to form a syphon, a flushing fluid inlet chamber remote from said evacuator system and disposed substantially above the normal fluid level in the bowl, momentum jet means arranged to discharge flushing fluid into said bowl to initiate syphonic flow of the contents thereof into and through said evacuator system, said momentum jet comprising a normally flooded channel opening into said supply chamber and extending therefrom without curvature to discharge at a point opposite the mouth of said upflow leg, a vortex-inducing jet served by said flushing fluid chamber and arranged to commence operation subsequently to the commencement of operation of said momentum jet and to be in operation concurrently therewith, rim channel means communicating directly with said flushing fluid chamber and rim jet discharge means disposed at a high point of said rim channel means and arranged to discharge water against the bowl subsequent to said vortex-jet means and to be in operation concurrently therewith, said rim channel means discharging back into the flushing fluid chamber and thence into the bowl at the termination of the discharge of said rim jet means.

2. A defecator, comprising a bowl having a well substantially centrally thereof, an evacuator system, including an anterior syphon leg having a mouth disposed forwardly of said well, and means for flushing said bowl, including a flushing water inlet chamber, a momentum jet channel communicating with said chamber and extending substantially without curvature to a point of discharge adjacent said well and in axial alignment with said syphon leg mouth, the said momentum jet channel being configurated at its discharge point to provide a broad flat-topped shallow stream following the curvature of said well and flowing into said syphon leg mouth, a vortex-inducing jet served from said flushing water inlet chamber and arranged to impart a vortical movement to the contents of said defecator bowl, the base of said vortex being proximate the upper surface of said momentum jet, rim flush means, and means whereby said momentum jet is in operation prior to the operation of said vortex jet and said rim flush, and is in operation subsequently to said vortex jet and rim flush operation.

3. A defecator, comprising a bowl having a well substantially centrally thereof, an evacuator system, including an anterior syphon leg having a mouth disposed forwardly of said well, and means for flushing said bowl, including a flushing water inlet chamber, a momentum jet channel communicating with said chamber and extending substantially without curvature to a point of discharge adjacent said well and in axial alignment with said syphon leg mouth, the said momentum jet channel being configurated at its discharge point to provide a broad flat-topped stream following the curvature of said well and flowing into said syphon leg mouth, a vortex-inducing jet served from said flushing water inlet chamber and arranged to impart a vortical movement to the contents of said defecator bowl, the base of said vortex being proximate the upper surface of said momentum jet, rim flush means, and means whereby said momentum jet is in operation prior to the operation of said vortex jet and said rim flush, and is in operation subsequently to said vortex jet and rim flush operation, said last mentioned means including a reservoir associated with said rim flush means and arranged to drain into said momentum jet channel upon the cessation of inflow of flushing water to said flushing water inlet chamber.

4. A defecator, comprising, in combination, a bowl, an evacuator system associated therewith, said evacuator system including an anterior leg extending forwardly and upwardly of said bowl and a downflow leg disposed forwardly of said bowl and communicating with a horizontally and rearwardly directed outflow passage, means at the terminal end of such outflow passage affording connection with a soil pipe or equivalent, means for flushing the bowl to evacuate the contents thereof, said means including a flushing water supply chamber, a momentum jet passage extending from said chamber directly into said bowl and terminating in an orifice disposed in axial alignment with the entrance of said evacuator system and in spaced relation therewith, vortex jet means associated with said supply chamber and arranged to induce centripetal action within said bowl to create a vortex having a base intermediate said momentum jet discharge orifice and said evacuator entrance, the depth of said vortex being limited by said momentum jet, said vortex jet operation commencing subsequently to the commencement of said momentum jet.

5. As an article of manufacture, a floor supported defecator, comprising the combination with a bowl having a lowermost well portion and an evacuator system including an upflow leg communicating with the well portion of the bowl, a downflow leg operatively associated therewith to form a complete syphon system, said downflow leg discharging into a pocket having an upwardly sloping discharge wall and a rearwardly directed discharge passage disposed wholly above the floor line and having its terminus arranged in a vertical plane, of means for evacuating the contents of the bowl into such horizontally disposed outflow leg, comprising a flushing water inlet chamber, momentum jet means arranged to discharge a broad flat-topped shallow stream from said inlet chamber directly into said well portion tangential to the base thereof for direct flow into said upflow evacuator leg, vortex jet means communicating with said inlet chamber and discharging into the bowl at substantially the water line thereof to induce a centripetal movement to the contents of the bowl subsequent to the initiation of said momentum jet means, and means arranged to discharge water against the upper portion of the bowl subsequently to the initiation of said vortex jet means.

WILLIAM C. GROENIGER.